United States Patent Office 3,736,309
Patented May 29, 1973

3,736,309
PRODUCTION OF DIHYDROPYRIDACENE POLYMERS WHICH ARE FREE OF INTER-MOLECULAR CROSS-LINKING
Klaus Hannes Gump, Gillette, and Dagobert Engelbert Stuetz, Westfield, N.J., assignors to Celanese Corporation, New York, N.Y.
No Drawing. Filed Nov. 10, 1970, Ser. No. 88,487
Int. Cl. C08f 3/76, 15/22, 27/00
U.S. Cl. 260—88.7 R                22 Claims

ABSTRACT OF THE DISCLOSURE

A process is provided for the conversion of an acrylic polymer to a form exhibiting increased thermal stability wherein pendant nitrile groups are catalytically cyclized to form a product which is free of inter-molecular cross-linking. The cyclization reaction is conducted at an elevated temperature in an oxygen-free zone in the homogeneous phase and is catalyzed by an organic cyclization promoting agent selected from the group consisting of a carboxylic acid, a sulfonic acid, and a phenol, or alternatively by the use of a Lewis acid cyclization promoting agent in combination with the organic cyclization promoting agent.

The resulting polymeric product may be utilized as an adhesive, a coating polymer, a matrix polymer, or formed into shaped articles, such as fibers or films when of sufficient molecular weight.

In a preferred embodiment of the process an acrylonitrile homopolymer is fully cyclized to form polydihydropyridacene homopolymer which is free of inter-molecular cross-linking.

BACKGROUND OF THE INVENTION

In the past various procedures have been proposed for the conversion of acrylic polymers to a modified form possessing enhanced thermal stability. Such modification has generally been accomplished by heating the acrylic polymer while in fiber form in an oxygen-containing atmosphere, such as ordinary air, at moderate temperatures for extended periods of time. The resulting product may be suitable for use as an intermediate in the formation of carbonized fibrous materials, or for direct utilization as a fire resistant fiber. U.S. Pat. Nos. 2,913,802 to Barnett and 3,285,696 to Tsunoda disclose representative processes for the conversion of acrylic fibers of acrylonitrile homopolymers or copolymers to a heat resistant form by heating in an oxygen-containing atmosphere. The thermal stabilization of fibers of acrylonitrile homopolymers and copolymers in an oxygen-containing atmosphere involves (1) an oxidative cross-linking reaction of adjoining molecules as well as (2) a cyclization reaction wherein a portion of the pendant nitrile groups are condensed to a dihydropyridine structure. While the reaction mechanism is complex and not readily explainable, it is believed that these two reactions occur concurrently according to the prior art, or are to some extent competing reactions. The cyclization reaction is exothermic and must be controlled if the fibrous configuration of the acrylic polymer undergoing stabilization is to be preserved.

Belgian Pat. No. 678,679 and French Pat. No. 1,471,993 disclose heating an acrylic polymer while in fiber form in an inert atmosphere (e.g. a gaseous nitrogen atmosphere) in order to effect the thermal stabilization of the same. The product resulting from such treatment is not only cyclized to a substantial degree, but also includes inter-molecular cross-linking.

Various techniques for catalyzing the thermal stabilization of acrylic polymers have also been developed. See, for instance, commonly assigned Ser. Nos. 777,901, (now U.S. Pat. No. 3,592,595) and 777,902, (now U.S. Pat. No. 3,647,770) filed Nov. 21, 1968 which involve the Lewis acid catalysis of the cyclization reaction. Subsequently, it has been found that while substantial cyclization of pendant nitrile groups results in such processes, the maximum degree of cyclization attainable is about 30 percent. In other words no more than about 30 percent of the pendant nitrile groups (—C≡N) are converted to carbimide groups

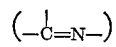

with the remaining pendant nitrile groups being uncyclized. Additionally, substantial inter-molecular cross-linking commonly occurs in such processes as evidenced by insolubility in conventional solvents. Accordingly, if the precursor is an acrylonitrile homopolymer, the resulting cyclized polymer prior to any optional heating in an oxygen-containing atmosphere is a copolymer consisting of up to about 30 mol percent polydihydropyridacene units combined with at least about 70 mol percent of acrylonitrile units with the adjoining molecules of the copolymer being cross-linked. After heating in an oxygen-containing atmosphere, as described, a copolymer is formed consisting of up to about 30 mol percent of polypyridacene units combined with at least about 70 mol percent of acrylonitrile units wherein the adjoining polymer chains are in a cross-linked relationship. During such heating each monomer unit of the polydihydropyridacene portion of the polymer chains undergoes deprotonization and tends to lose two hydrogen atoms.

It is an object of the present invention to provide a process for increasing the thermal stability of acrylic polymers.

It is an object of the present invention to provide novel dihydropyridacene polymers which are free of inter-molecular crosslinking.

It is another object of the present invention to provide a process for converting acrylic polymers to a fully cyclized form which is suitable for use in the formation of high temperature resistant fibers.

It is a further object of the present invention to provide a novel polymeric material derived from an acrylic polymer which is suitable for use as a precursor in the formation of carbon fibers.

These and other objects, as well as the scope, nature, and utilization of the invention, will be apparent from the following detailed description and appended claims.

SUMMARY OF THE INVENTION

It has been found that a process for converting an acrylic polymer selected from the group consisting of an acrylonitrile homopolymer and acrylonitrile copolymers containing at least about 85 mol percent of acrylonitrile units and up to about 15 mol percent of monovinyl units copolymerized therewith to a cyclized form in the absence of intermolecular cross-linking comprises (a) providing a solution of said acrylic polymer which contains a catalytic quantity of an organic cyclization promoting agent selected from the group consisting of a carboxylic acid, a sulfonic acid and a phenol, (b) heating said solution while present in an essentially oxygen-free zone at a temperature of about 160 to 240° C. for about 45 minutes to 16 hours, and (c) recovering the resulting cyclized polymer.

In a preferred embodiment of the invention a catalytic quantity of a Lewis acid cyclization promoting agent is included in the solution, and the solution is initially heated in an essentially oxygen-free zone at a temperature of about 100 to 155° C. for about 45 minutes to 10 hours.

A novel dihydropyridacene polymer is produced in which the pendant nitrile groups are completely cyclized and the polymer chains are free of inter-molecular cross-linking.

DESCRIPTION OF PREFERRED EMBODIMENTS

The acrylic polymer which is utilized as the starting material is either (1) an acrylonitrile homopolymer, or (2) an acrylonitrile copolymer containing at least about 85 mol percent of acrylonitrile units and up to about 15 mol percent of one or more monovinyl units copolymerized therewith. Acrylonitrile homopolymers are particularly preferred for use in the present process. The preferred acrylonitrile copolymers contain at least about 95 mol percent of acrylonitrile units and up to about 5 mol percent of one or more monovinyl units copolymerized therewith. Suitable monovinyl units include styrene, methyl acrylate, methyl methacrylate, vinyl acetate, vinyl chloride, vinylidene chloride, vinyl pyridine, and the like, or a plurality of such comonomers.

It has been found that the molecular weight of the resulting dihydropyridacene polymer formed in accordance with the present process is generally directly proportional to the molecular weight of the acrylic polymer starting material. When it is desired to employ the resulting dihydropyridacene polymer in the formation of shaped articles such as fibers, it is recommended that the acrylic precursor have a molecular weight of at least about 50,000, and preferably about 100,000 to 250,000, as determined by inherent viscosity in N,N-dimethylformamide and the equation $[\eta]_{25} = 2.54 \times 10^{-4} M^{0.75}$. When it is desired to employ the resulting dihydropyridacene polymer as an adhesive or a coating material, then the acrylic precursor may optionally have a substantially lower molecular weight. For instance, an acrylic polymer having a molecular weight of 40,000 or even lower, may be selected.

The acrylic polymer is dissolved in a solvent for the same to form a homogeneous solution. Representative solvents include N,N-dimethylformamide, N,N-dimethylacetamide, dimethyl sulfoxide, butyrolactone, N-methyl-2-pyrrolidone, maleic anhydride, ethylene carbonate, etc. The preferred solvent for use in the process is N,N-dimethylacetamide. It is recommended that the solvent be provided in essentially anhydrous form and free of oxygen. Accordingly, the solvent may be conveniently dried by running through a bed of drying agent (e.g. Linde sieves, activated alumina, etc.). Atmospheric moisture pick-up may also be avoided by blanketing with an inert gas as described hereafter. In a preferred solutioning technique the finely divided acrylic polymer is suspended in the solvent which has been chilled to −20° C., and is subsequently tumbled under a nitrogen atmosphere at room temperature for about 12 hours. The acrylic polymer is provided in the solvent in a concentration of about 0.5 to 30 percent by weight based upon the total weight of the solution, and preferably in a concentration of about 5 to 15 percent by weight.

Either before, after, or simultaneously with the dissolution of the acrylic polymer in the solvent an organic cyclization promoting agent is also dissolved in the solvent. The organic cyclization promoting agent is selected from the group consisting of a carboxylic acid, a sulfonic acid, and a phenol. A catalytic quantity of an organic cyclization promoting agent is provided in the solution, e.g. in a concentration of about 0.1 to 10 percent by weight based upon the weight of the acrylic polymer and preferably in a concentration of about 1 to 2 percent by weight.

Suitable carboxylic acid cyclization promoting agents have a $pK_A$ ranging from about 0.6 to about 15. Such $pK_A$ values may be conveniently ascertained by determining the negative logarithm of the $K_A$ for a given carboxylic acid in a 0.1 M aqueous solution at 25° C. It has been found that the preferred carboxylic acid cyclization promoting agents have a $pK_A$ of about 9 to about 15. Such relatively weak carboxylic acids exhibit a lesser tendency to influence polymer chain scission during the reaction and accordingly tend to yield an ultimate polydihydropyridacene product of higher molecular weight. In those instances where a lesser molecular weight cyclized product is satisfactory and particularly when the optional Lewis acid cyclization promoting agent (described hereafter is additionally present in the solution, carboxylic acids having a $pK_A$ substantially less than 9 can be selected.

Representative preferred carboxylic acids having a $pK_A$ within the range of 9 to 15 are: salicylic acid, m-hydroxybenzoic acid, p-hydroxybenzoic acid, lysine, glycine, ascorbic acid, saccharin, etc. Representative carboxylic acids for use in the process possessing a lesser $pK_A$ include: trichloroacetic acid, o-nitrobenzoic acid, m-nitrobenzoic acid, p-nitrobenzoic acid, 1-naphthoic acid, 2-naphthoic acid, benzoic acid, acetic acid, adipic acid, o-aminobenzoic acid, o-bromobenzoic acid, m-bromobenzoic acid, p-bromobenzoic acid, butyric acid, o-chlorobenzoic acid, m-chlorobenzoic acid, p-chlorobenzoic acid, chlorophenylacetic acid, citric acid, cyanoacetic acid, fumaric acid, itaconic acid, maleic acid, oxalic acid, o-phthalic acid, m-phthalic acid, p-phthalic acid, etc. The particularly preferred carboxylic acid cyclization promoting agent for use in the process is salicylic acid.

Any of the sulfonic acids may be utilized as cyclization promoting agents in the present process. Representative sulfonic acids include: methane sulfonic acid, and aromatic sulfonic acids such as o-toluene sulfonic acid, m-toluene sulfonic acid, p-toluene sulfonic acid, 2,4-xylene sulfonic acid, benzene sulfonic acid, m-nitrobenzene sulfonic acid, m-benzene disulfonic acid, toluene-2,4-disulfonic acid, p-chlorobenzene sulfonic acid, 2-naphthalene sulfonic acid, etc. The preferred sulfonic acid for use in the process is p-toluene sulfonic acid.

The phenol cyclization promoting agent may be simple phenol (i.e. carbolic acid) or other phenolic compounds, e.g. o-nitrophenol, o-cresol, m-cresol, p-cresol, hydroquinone, 8-hydroxyquinoline, o-chlorophenol, m-chlorophenol, p-chlorophenol, alpha-naphthol, beta-napthol, pyrocatechol, resorcinol, etc. The preferred phenolic compound for use as an organic cyclization promoting agent is simple phenol.

The sole cyclization promoting agent present in the solution of acrylic polymer may be an organic cyclization promoting agent as described above. However, in a preferred embodiment of the process a catalytic quantity of Lewis acid cyclization promoting agent is additionally dissolved in the solution of acrylic polymer. The Lewis acid cyclization promoting agent may be dissolved in the solvent before, after, or simultaneously with the acrylic polymer. The Lewis acid cyclization promoting agent is provided in the solution in a concentration of about 0.5 to 10 percent by weight based upon the weight of the acrylic polymer, and preferably in a concentration of about 1 to 2 percent by weight based upon the weight of the acrylic polymer.

Suitable Lewis acid cyclization promoting agents include stannous chloride ($SnCl_2$), stannic chloride ($SnCl_4$) boron fluoride ($CB_3$), sulfur trioxide ($SO_3$), ferric chloride ($FeCl_3$), titanium tetrachloride ($TiCl_4$), aluminum chloride ($AlCl_3$), and indium dichloride ($InCl_2$). The preferred Lewis acid for use in the present process is stannous chloride. The high present cost of indium dichloride militates against its selection.

In a variation of the process the Lewis acid is added to the solvent in the form of a complex previously formed with nucleophilic reagents such as ethers, amides, or tertiary amines. These complexes tend to be hydrolytically and thermally more stable than the parent Lewis acids and offer significant handling advantages particularly when the Lewis acid is normally a gas or liquid. The particularly preferred complex forming base is N,N-dimethylformamide. Suitable complexes may be formed by dissolving the Lewis acid in a solvent, e.g. dry chloroform, and incrementally adding an excess of the complex forming base with stirring. A complex forms as a precipitate which may be isolated by filtration, washed, and dried. The ratio of Lewis acid to base in the complex is dependent upon the stoichiometric composition of the acid-base complex. For instance, BF$_3$ forms a 1:1 complex with ethers. The preferred complex contains one mol stannic chloride per two mols of N,N-dimethylformamide.

The solution of acrylic polymer and the organic cyclization promoting agent (and optionally the Lewis acid cyclization promoting agent) is conveniently formed at moderate temperatures below about 100° C., and preferably at about room temperature (e.g. about 25° C.).

While present in an oxygen-free environment the solution is heated, preferably with continuous agitation, at a temperature of about 160 to 240° C. (preferably 180 to 220° C.) for about 45 minutes to 16 hours to form the completely cyclized acrylic polymer. The duration of the heating is generally inversely proportional to the temperature selected. Accordingly, longer heating times will be required to complete cyclization at 160° C. than at 240° C.

In a preferred embodiment of the process wherein both an organic cyclization promoting agent and a Lewis acid cyclization promoting agent are present in the solution, the solution is initially heated while present in an essentially oxygen-free zone (preferably with agitation) at a temperature of about 100 to 155° C. (preferably about 120 to 140° C.) for about 45 minutes to 10 hours, and is subsequently heated while present in an essentially oxygen-free zone (preferably with agitation) at a temperature of about 160 to 240° C. (preferably 180 to 220° C.) for about 45 minutes to 16 hours. The duration of each heating step in such preferred embodiment is generally inversely proportional to the temperature selected.

The heat treatment of the present process may be conducted in any apparatus capable of maintaining the solution at the desired temperature while preventing contact between the solution and molecular oxygen. Representative apparatus include a resin kettle, an autoclave, pressure tubes, etc. A convenient method for excluding the presence of oxygen is to blanket the solution with an inert gaseous atmosphere such as nitrogen, argon, or helium. One may alternatively carry out the reaction at superatmospheric pressures.

It has been found that while in each embodiment of the process described above a completely cyclized dihydropyridacene polymer product is formed in the absence of inter-molecular cross-linking, a product of greater molecular weight results when one employs a combination of an organic and a Lewis acid cyclization promoting agent in the polymer solution as described. It is believed that the organic cyclization promoting agent inhibits and prevents inter-molecular cross-linking during the initial heating at about 100 to 155° C. at which time up to approximately 30 mol percent of the pendant nitrile groups of the acrylonitrile units are cyclized. Subsequently at the higher temperature of about 160 to 240° C. the remainder of the pendant nitrile groups of the acrylonitrile units are completely cyclized still in the absence of any form of inter-molecular cross-linking. The cyclization reaction is also carried out with minimal simultaneous thermal degradation in the presence of the catalyst combination.

At the conclusion of the heat treatment the resulting dihydropyridacene polymer may be recovered by conventional techniques. The resulting dihydropyridacene polymer is insoluble in the solvent and commonly exhibits a gel-like consistency. The product may be fully precipitated by admixture with a further non-solvent such as methylene chloride. Optionally, the reaction mixture can be solutioned by addition of formic acid, and the dihydropyridacene polymer product precipitated by admixture with an aqueous basic medium, e.g. an aqueous solution of sodium hydroxide. The resulting polymer may be separated by filtration, washed, and dried such as by placing in vacuum chamber (e.g. at 10 mm. Hg) provided at a slightly elevated temperature, e.g. 50 to 100° C.

In accordance with the present invention a novel dihydropyridacene polymer is formed which is free of inter-molecular cross-linking consisting of 85 to 100 mol percent of acrylonitrile units wherein the pendant nitrile groups thereof are fully cyclized, and 0 to 15 mol percent of copolymerized monovinyl units. In a preferred embodiment of the process wherein the starting polymer is an acrylonitrile homopolymer the dihydropyridacene polymer is free of inter-molecular cross-linking and consists of 100 mol percent of acrylonitrile units wherein the pendant nitrile groups thereof are fully cyclized. Such preferred polymer product consists of recurring units of the structural formula indicated below where (I) represents the recurring structure of the starting material (e.g. 4 acrylonitrile units), and (II) represents the structure of the fully cyclized product.

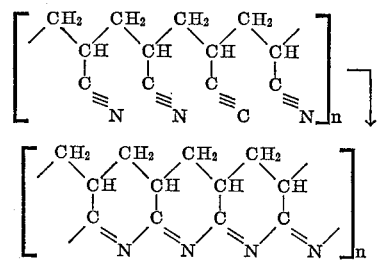

When dihydropyridacene copolymers are formed containing 0 to 15 mol percent of copolymerized monovinyl units the structural formula of the polymer is directly analogous to that of (II) with the exception that the monovinyl units are randomly dispersed within the polymer chain.

The resulting polymers which are linear in nature and may be termed "ladder" polymers are commonly light brown to reddish brown in color. These polymers are insoluble in all common acrylic solvents, but can be dissolved in formic acid, sulfuric acid, trifluoroacetic acid, and mixtures of these acids with N,N-dimethylformamide, acetonitrile, ethylene glycol, etc.

The complete cyclization of pendant nitrile groups within the polymer product may be confirmed by infra-red analysis, differential thermal analysis, and thermogravimetric analysis. The absence of inter-molecular cross-linking within the polymer product may be confirmed by product solubility.

When the dihydropyridacene homopolymer is subjected to thermal gravimetric analysis wherein the polymer product is heated from room temperature in an air atmosphere at a rate of 20° C. per minute, no weight loss is commonly observed when temperatures of 375° C. or more are reached. Conversely, an acrylonitrile homopolymer commonly experiences a 30 to 40 percent weight loss when a temperature in the range of 265 to 300° C. is reached. Differential thermal analysis of the polymer product of the invention indicates that the explosive exotherm exhibited when an acrylic polymer is heated to a temperature of about 300 to 310° C. is completely absent. Additionally, infra-red analysis of the polymer product indicates a complete absence of nitrile (—C≡N) absorption and the prominent presence of a conjugated (—C=N—) structure.

The polymer product of the present invention is particularly suited for use in applications where high temperature resistance is required. It is suitable for use as an adhesive, a coating polymer, a matrix polymer, or for use in the formation of shaped articles, such as fibers or films. For instance, the polymer may be dissolved in an acidic solvent, and applied as a tenacious protective coating of high scratch resistance. Fibers or films of the product may be spun or cast. For instance, the polymer may be dissolved in a formic acid solvent, and extruded through an appropriate orifice into a coagulation bath of methylene chloride. Alternatively, the product may be dissolved in a trifluoroacetic acid solvent, and extruded into an evaporative atmosphere of nitrogen.

Fibers formed of the dihydropyridacene polymer are particularly suitable for use as a precursor for thermal conversion into a carbon or graphite fiber.

The following examples are given as specific illustrations of the invention. It should be understood, however, that the invention is not limited to the specific details set forth in the examples.

EXAMPLE I

A polyacrylonitrile homopolymer having a molecular weight of about 170,000 and an intrinsic viscosity (I.V.) at 25° C. of about 4.38 dl./g. when dissolved in N,N-dimethylformamide in a concentration of 0.5 percent by weight was selected as the starting material. The polymer was dissolved in N,N-dimethylacetamide provided at a temperature of about 20° C. in a concentration of 15 percent by weight based upon the total weight of the solution. Four aliquots of the polymer solution were transferred to sealable tubes which were flushed with nitrogen, and benzoic acid was added to each aliquot in concentrations of 0.1, 1, 5, and 10 percent by weight based upon the weight of the polymer. The tubes were next sealed and heated at 220° C. for 2 hours. After allowing the contents of the tubes to cool to room temperature (i.e. about 25° C.), the polymer product was recovered by pouring the contents into a vessel of methylene chloride, and separating the solid product by filtration. The product was next washed and dried in a vacuum at 60° C.

The resulting polymer was light brown in color, and from each tube was found to be a dihydropyridacene homopolymer which was free of inter-molecular cross-linking. The pendant nitrile groups of the acrylonitrile units were fully cyclized.

EXAMPLE II

Example I was repeated employing as the starting material seven different acrylonitrile homopolymers of varying molecular weights. In each instance benzoic acid served as the organic cyclization promoting agent and was present in a concentration of 1 percent by weight based upon the weight of the acrylic polymer. A fully cyclized dihydropyridacene homopolymer was obtained in each instance which was free of intermolecular cross-linking. The relative molecular weights of the starting materials and of the products are indicated as follows:

| | I.V. of starting material, dl./g. | I.V. of product, dl./g. |
|---|---|---|
| Run number: | | |
| 1 | 1.3 | 0.11 |
| 2 | 2.2 | 0.17 |
| 3 | 3.6 | 0.26 |
| 4 | 4.4 | 0.31 |
| 5 | 6.2 | 0.57 |
| 6 | 7.0 | 0.62 |
| 7 | 8.3 | 0.69 |

The I.V. of the starting material was determined at 25° C. when dissolved in N,N-dimethylformamide in a concentration of 0.5 percent by weight. The I.V. of the product was determined at 25° C. when dissolved in sulfuric acid in a concentration of 0.1 percent by weight. The comparative values achieved indicates that the molecular weight of the product tends to be directly proportional to the molecular weight of the starting material.

EXAMPLE III

Example I was repeated with the exception that various carboxylic acids and phenols were selected as the organic cyclization promoting agent. The polyacrylonitrile homopolymer starting material was dissolved in N,N-dimethylacetamide in a concentration of 10 percent by weight based upon the weight of the total solution. Each of the organic cyclization promoting agents was provided in a concentration of 1 percent by weight based upon the weight of the polymer. The relative molecular weights of the fully cyclized dihydropyridacene homopolymer products which were free of inter-molecular cross-linking are indicated as follows:

| | Organic cyclization promoting agent | $pK_a$ | I.V. of product, dl./g. |
|---|---|---|---|
| Run number: | | | |
| 1 | Trichloroacetic acid | 0.70 | 0.12 |
| 2 | o-Nitrobenzoic acid | 2.16 | 0.17 |
| 3 | 1-naphthoic acid | 3.70 | 0.17 |
| 4 | Benzoic acid | 4.19 | 0.19 |
| 5 | o-Nitrophenol | 7.17 | 0.21 |
| 6 | Phenol | 9.89 | 0.23 |
| 7 | Salicylic acid | 13.40 | 0.31 |

The I.V. of the product was determined at 25° C. when dissolved in sulfuric acid in a concentration of 0.1 percent by weight. The above table indicates that the I.V. of the product tends to increase with the $pK_A$ of the carboxylic acid or phenol organic cyclization promoting agent.

EXAMPLE IV

Example I was repeated with the exception that an acrylonitrile homopolymer having an I.V. at 25° C. of about 4.38 dl./g. when dissolved in N,N-dimethylformamide in a concentration of 0.5 percent by weight was selected as the starting material. The polymer was dissolved in N,N-dimethylacetamide in a concentration of 10 percent by weight based upon the weight of the total solution. Benzoic acid served as the organic cyclization promoting agent and was present in a concentration of 1 percent by weight, based upon the weight of the polymer. Portions of the solution were heated at various temperatures and the approximate times required to complete the cyclization of pendant nitrile groups of the acrylonitrile units to form a dihydropyridacene homopolymer which was free of inter-molecular cross-linking were recorded. The results are summarized in the following table:

| | Reaction temperature, ° C. | Time at reaction temperature (hrs.) | I.V. of product, dl./g. |
|---|---|---|---|
| Run number: | | | |
| 1 | 180 | 12.5 | 0.29 |
| 2 | 200 | 4 | 0.24 |
| 3 | 220 | 2 | 0.19 |
| 4 | 240 | 1 | 0.09 |

The I.V. of the product was determined at 25° C. when dissolved in sulfuric acid in a concentration of 0.1 percent by weight. The results indicate the rate at which the cyclization proceeds is directly related to the temperature of the solution. Additionally, a product of higher molecular weight is produced at the more moderate reaction temperatures.

EXAMPLE V

Example I was repeated with the exception that an acrylonitrile homopolymer having an I.V. at 25° C. of 3.6 dl./g. when dissolved in N,N-dimethylformamide in a concentration of 0.5 percent by weight was selected as the starting material. The polymer was dissolved to form solutions of varying polymer concentration. Benzoic acid served as the organic cyclization promoting agent and was present in a concentration of 1 percent by weight based upon the weight of the polymer in each solution. The I.V. of fully cyclized dihydropyridacene polymer obtained in each instance is indicated in the table below. In each instance the product was free of inter-molecular cross-linking.

| | Weight percent of starting polymer in solution[1] | I.V. of product, dl./g. |
|---|---|---|
| Run number: | | |
| 1 | 5 | 0.14 |
| 2 | 10 | 0.26 |
| 3 | 15 | 0.28 |
| 4 | 20 | 0.27 |

[1] Based on total weight of solution.

The I.V. of the product was determined at 25° C. when dissolved in sulfuric acid in a concentration of 0.1 percent by weight. The results indicate that the I.V. of the product tends to be greater when the acrylic polymer is provided in the solvent in relatively higher concentrations.

EXAMPLE VI

Example I is repeated with the exception that the organic cyclization agent is p-toluene sulfonic acid. Substantially similar results are achieved.

EXAMPLE VII

Example II is repeated employing as the starting material an acrylonitrile copolymer consisting of 95 mol percent of acrylonitrile units and 5 mol percent styrene units, and having an I.V. of 2.4 dl./g. determined at 25° C. when dissolved in N,N-dimethylformamide in a concentration of 0.5 percent by weight.

The dihydropyridacene polymer product was free of inter-molecular cross-linking and consisted of 95 mol percent of acrylonitrile units wherein the pendant nitrile groups thereof were fully cyclized, and 5 mol percent of copolymerized styrene units. The I.V. of the product was 0.21 dl./g. when determined at 25° C. while dissolved in sulfuric acid in a concentration of 0.1 percent by weight.

EXAMPLE VIII

Catalytic quantities of salicylic acid and stannous chloride were added with stirring to N,N-dimethylacetamide which was provided at about 20° C. in a one-liter autoclave. An acrylonitrile homopolymer was next added while stirring continued. The acrylonitrile homopolymer had a molecular weight of about 230,000 and an intrinsic viscosity (I.V.) at 25° C. of about 5.0 dl./g. when dissolved in N,N-dimethylformamide in a concentration of 0.5 percent by weight. The resulting solution contained the polymer in a concentration of 15 percent by weight based upon the total weight of the solution, the salicylic acid in a concentration of 1 percent by weight based upon the weight of the acrylic polymer, and the stannous chloride in a concentration of 1 percent by weight based upon the weight of the acrylic polymer.

While undergoing stirring under a nitrogen atmosphere the solution was initially heated at 140° C. for 90 minutes, and subsequently heated at 200° C. for 4 hours.

The polymer was isolated as described in Example I, and was found to exhibit the relatively high I.V. of 1.4 dl./g. The resulting polymer was a dihydropyridacene homopolymer which was free of inter-molecular cross-linking and consisted of 100 mol percent of acrylonitrile units wherein the pendant nitrile groups thereof were fully cyclized. Because of its relatively high molecular weight, the resulting product was particularly suited for use in the formation of fibers through a wet spinning technique.

EXAMPLE IX

Example VIII is repeated with the exception that the organic cyclization promoting agent is p-toluene sulfonic acid, and the Lewis acid cyclization promoting agent is stannic chloride.

Substantially similar results are achieved.

EXAMPLE X

Example VIII is repeated with the exception that the organic cyclization promoting agent is phenol, and the Lewis acid cyclization promoting agent is boron fluoride. Substantially similar results are achieved.

EXAMPLE XI

Example VIII is repeated with the exception that the organic cyclization promoting agent is benzoic acid, and the Lewis acid cyclization promoting agent is sulfur trioxide.

Substantially similar results are acheived.

EXAMPLE XII

Example VIII is repeated with the exception that the organic cyclization promoting agent is o-nitrophenol and the Lewis acid cyclization promoting agent is ferric chloride.

Substantially similar results are achieved.

EXAMPLE XIII

Example VIII is repeated with the exception that the organic cyclization promoting agent is 1-naphthoic acid and the Lewis acid cyclization promoting agent is titanium tetrachloride.

Substantially similar results are achieved.

EXAMPLE XIV

Example VIII is repeated with the exception that the organic cyclization promoting agent is trichloroacetic acid and the Lewis acid cyclization promoting agent is aluminum chloride.

Substantially similar results are achieved.

EXAMPLE XV

Example VIII is repeated with the exception that the organic cyclization promoting agent is anthranilic acid and the Lewis acid cyclization promoting agent is indium dichloride.

Substantially similar results are achieved.

EXAMPLE XVI

Example VIII is repeated with the exception that the organic cyclization promoting agent is benzoic acid and the Lewis acid cyclization promoting agent is aluminum chloride.

Substantially similar results are achieved.

EXAMPLE XVII

Example VIII is repeated with the exception that the organic cyclization promoting agent is benzoic acid and the Lewis acid cyclization promoting agent is stannic chloride.

Substantially similar results are achieved.

EXAMPLE XVIII

Example VIII is repeated employing as the starting material the acrylonitrile copolymer utilized in Example VII, benzoic acid as the organic cyclization promoting agent, and a stannic chloride-N,N-dimethylformamide complex in a mol ratio of 1:2 as the Lewis acid cyclization promoting agent.

A dihydropyridacene polymer product identical to that obtained in Example VII results with the exception that its molecular weight is substantially greater than that exhibited by the product of Example VII.

Although the invention has been described with preferred embodiments, it is to be understood that variations and modifications may be resorted to as will be apparent to those skilled in the art. Such variations and modifications are to be considered within the purview and scope of the claims appended hereto.

We claim:

1. A process for converting an acrylic polymer selected from the group consisting of an acrylonitrile homopolymer and acrylonitrile copolymers containing at least about 85 mol percent of acrylonitrile units and up to about 15 mol percent of monovinyl units copolymerized therewith to a fully cyclized form in the absence of intermolecular cross-linking comprising:
  (a) providing a solution of said acrylic polymer which contains a catalytic quantity of an organic cyclization promoting agent selected from the group consisting of a carboxylic acid, a sulfonic acid, and a phenol,
  (b) heating said solution while present in an essentially oxygen-free zone at a temperature of about 160 to 240° C. for about 45 minutes to 16 hours, and
  (c) recovering the resulting fully cyclized polymer.

2. A process according to claim 1 wherein said acrylic polymer is an acrylonitrile homopolymer.

3. A process according to claim 1 wherein the solvent utilized in the formation of said solution of said acrylic polymer is selected from the group consisting of N,N-dimethylformamide, N,N - dimethylacetamide, dimethyl sulfoxide, butyrolactone, N-methyl-2-pyrrolidone, maleic anhydride, and ethylene carbonate.

4. A process according to claim 3 wherein said solvent is N,N-dimethylacetamide.

5. A process according to claim 1 wherein said acrylic polymer is initially provided in said solution in a concentration of about 0.5 to 30 percent by weight based upon the total weight of the solution.

6. A process according to claim 1 wherein said organic cyclization promoting agent is present in said solution in a concentration of about 0.1 to 10 percent by weight based upon the weight of the acrylic polymer.

7. A process according to claim 6 wherein said organic cyclization promoting agent is a carboxylic acid having a $pK_A$ of about 9 to about 15.

8. A process according to claim 7 wherein said organic cyclization promoting agent is salicylic acid.

9. A process according to claim 6 wherein said organic cyclization promoting agent is a phenol.

10. A process for converting an acrylic polymer selected from the group consisting of an acrylonitrile homopolymer and acrylonitrile copolymers containing at least about 85 mol percent of acrylonitrile units and up to about 15 mol percent of monovinyl units copolymerized therewith to a fully cyclized form in the absence of intermolecular cross-linking comprising:
  (a) providing a solution of said acrylic polymer which contains a catalytic quantity of a Lewis acid cyclization promoting agent selected from the group consisting of stannous chloride, stannic chloride, boron fluoride, sulfur trioxide, ferric chloride, titanium tetrachloride, aluminum chloride, and indium dichloride, and which contains a catalytic quantity of an organic cyclization promoting agent selected from the group consisting of a carboxylic acid, a sulfonic acid, and a phenol,
  (b) initially heating said solution while present in an essentially oxygen-free zone at a temperature of about 100 to 155° C. for about 45 minutes to 10 hours,
  (c) subsequently heating said solution while present in an essentially oxygen-free zone at a temperature of about 160 to 240° C. for about 45 minutes to 16 hours, and
  (d) recovering the resulting fully cyclized polymer.

11. A process according to claim 10 wherein said acrylic polymer is an acrylonitrile homopolymer.

12. A process according to claim 10 wherein the solvent utilized in the formation of said solution of said acrylic polymer is selected from the group consisting of N,N-dimethylformamide, N,N-dimethylacetamide, dimethyl sulfoxide, butyrolactone, N-methyl-2-pyrrolidone, maleic anhydride, and ethylene carbonate.

13. A process according to claim 12 wherein said solvent is N,N-dimethylacetamide.

14. A process according to claim 12 wherein said acrylic polymer is initially provided in said solution in a concentration of about 0.5 to 30 percent by weight based upon the total weight of the solution.

15. A process according to claim 10 wherein said Lewis acid cyclization promoting agent is present in said solution in a concentration of about 0.5 to 10 percent by weight based upon the weight of the acrylic polymer.

16. A process according to claim 15 wherein said Lewis acid cyclization promoting agent is stannous chloride.

17. A process according to claim 10 wherein said organic cyclization promoting agent is present in said solution in a concentration of about 0.1 to 10 percent by weight based upon the weight of the acrylic polymer.

18. A process according to claim 17 wherein said organic cyclization promoting agent is a carboxylic acid having $pK_A$ of about 9 to about 15.

19. A process according to claim 18 wherein said organic cyclization promoting agent is salicylic acid.

20. A process according to claim 17 wherein said organic cyclization promoting agent is phenol.

21. A dihydropyridacene polymer which is free of inter-molecular cross-linking consisting of 85 to 100 mol percent of acrylonitrile units wherein the pendant nitrile groups thereof are fully cyclized as illustrated in the structural formula:

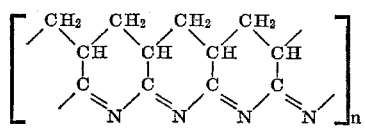

and 0 to 15 mol percent of copolymerized monovinyl units other than acrylonitrile units dispersed within the polymer chain.

22. A dihydropyridacene polymer according to claim 21 which is free of inter-molecular cross-linking consisting of 100 mol percent of said acrylonitrile units wherein the pendant nitrile groups thereof are fully cyclized.

References Cited

UNITED STATES PATENTS 3,006,756   10/1961   Volker et al. _____ 260—88.7 B
3,172,879    3/1965   Ferstandig et al. __ 260—85.5 S
3,406,139   10/1968   Hurwitz et al. _____ 260—85.5 S HARRY WONG, Jr., Primary Examiner 8—162; 117—161; 260—29.1 R, 30.2 30.8 R, 30.80 S, 31.2 N, 31.84 N, 32.2, 32.6 N, 85.5 S; 264—29